United States Patent
Kim et al.

(10) Patent No.: US 9,342,141 B2
(45) Date of Patent: *May 17, 2016

(54) AUDIO/VIDEO DEVICE, APPARATUS AND METHOD FOR CONTROLLING AUDIO/VIDEO DEVICE

(71) Applicant: SAMSUNG ELECTRONICS CO., LTD., Suwon-si (KR)

(72) Inventors: Yong-jun Kim, Suwon-si (KR); Jung-Yon Cho, Seoul (KR); Goo Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 312 days.

This patent is subject to a terminal disclaimer.

(21) Appl. No.: 13/947,676

(22) Filed: Jul. 22, 2013

(65) Prior Publication Data

US 2013/0311884 A1    Nov. 21, 2013

Related U.S. Application Data

(63) Continuation of application No. 10/912,285, filed on Aug. 6, 2004, now Pat. No. 8,504,637.

(60) Provisional application No. 60/492,979, filed on Aug. 7, 2003.

(30) Foreign Application Priority Data

Aug. 7, 2003  (KR) .................. 10-2003-0054790
Oct. 1, 2003  (KR) .................. 10-2003-0068360

(51) Int. Cl.
*H04L 29/08*  (2006.01)
*G06F 3/01*  (2006.01)

(52) U.S. Cl.
CPC  *G06F 3/01* (2013.01); *H04L 67/02* (2013.01); *H04L 67/025* (2013.01); *H04L 67/125* (2013.01); *H04L 69/329* (2013.01)

(58) Field of Classification Search
None
See application file for complete search history.

(56) References Cited

U.S. PATENT DOCUMENTS 6,032,202 A     2/2000  Lea et al.
6,160,796 A *  12/2000  Zou .............................. 370/257

(Continued)

FOREIGN PATENT DOCUMENTS

CN    1353899 A     6/2002
DE    10039901 A1   2/2002

(Continued)

OTHER PUBLICATIONS

European Search Report issued on Apr. 6, 2011 in the corresponding European Patent Application No. 04774095.6.

(Continued)

*Primary Examiner* — Patrice Winder
(74) *Attorney, Agent, or Firm* — Sughrue Mion, PLLC

(57) ABSTRACT

Disclosed is an apparatus for controlling an AV device, comprising a web browser receiving a structured document to contain a script from the AV device, and providing the same to a user, and a first program module including a function called by the script and transmitting information on a device control command to the AV device through a protocol previously defined by use of the function, wherein the AV device comprises a web server module transmitting the structured document and a second program module receiving the device control command information from the first program module through the protocol and controlling the AV device in response to the command information.

18 Claims, 13 Drawing Sheets

(56) References Cited

U.S. PATENT DOCUMENTS

| | | | |
|---|---|---|---|
| 6,182,094 B1 | 1/2001 | Humpleman et al. | |
| 6,198,479 B1 | 3/2001 | Humpleman et al. | |
| 6,199,136 B1 | 3/2001 | Shteyn | |
| 6,266,681 B1 | 7/2001 | Guthrue | |
| 6,282,454 B1 | 8/2001 | Papadopoulos et al. | |
| 6,349,352 B1 * | 2/2002 | Lea | 710/72 |
| 6,546,419 B1 | 4/2003 | Humpleman et al. | |
| 6,734,879 B2 | 5/2004 | Hasha et al. | |
| 6,757,773 B1 * | 6/2004 | Brelin | 710/305 |
| 6,801,507 B1 | 10/2004 | Humpleman et al. | |
| 6,941,340 B2 * | 9/2005 | Kim et al. | 709/203 |
| 6,944,704 B2 | 9/2005 | Brelin | |
| 7,017,175 B2 | 3/2006 | Alao et al. | |
| 7,130,895 B2 | 10/2006 | Zintel et al. | |
| 7,136,709 B2 * | 11/2006 | Arling et al. | 700/65 |
| 7,178,106 B2 | 2/2007 | Lamkin et al. | |
| 7,200,683 B1 | 4/2007 | Wang et al. | |
| 7,218,243 B2 | 5/2007 | Hayes et al. | |
| 7,257,638 B2 | 8/2007 | Celik et al. | |
| 7,337,217 B2 * | 2/2008 | Wang | 709/217 |
| 7,890,610 B2 * | 2/2011 | Oeda et al. | 709/220 |
| 2001/0052028 A1 | 12/2001 | Roberts et al. | |
| 2001/0052058 A1 | 12/2001 | Ohran | |
| 2002/0087996 A1 | 7/2002 | Bi et al. | |
| 2003/0009537 A1 * | 1/2003 | Wang | 709/219 |
| 2003/0140107 A1 | 7/2003 | Rezvani et al. | |

FOREIGN PATENT DOCUMENTS

| | | |
|---|---|---|
| JP | 11-73418 A | 11/1998 |
| JP | 2001-1 4271 1 A | 5/2001 |
| KR | 2001-0110021 A | 12/2001 |
| KR | 2002-0006320 A | 1/2002 |
| KR | 2002-0015856 A | 3/2002 |
| RU | 2001/117826 A | 7/2003 |
| WO | 99/17210 A1 | 4/1999 |
| WO | 0076130 A1 | 12/2000 |
| WO | 01/39046 A1 | 5/2001 |
| WO | 02/25897 A1 | 3/2002 |

OTHER PUBLICATIONS

"Embedded Realplayer Extended Functionality Guide", RealSystem GG2, Revision Date: Dec. 21, 1998.

RealServer Administration Guide, Version 5.0, RealNetworks, Inc., 1995-1997.

Office Action in Application No. 2006106907/(007472) at Russian Patent Office, of Jan. 22, 2006.

RealAudio and Real Video Content Creation Guide Version 5.0, RealNetworks, Inc.

Decision on Grant Patent for Invention for Russian Application No. 2006106907/(007472) dated Jul. 9, 2007.

\* cited by examiner

FIG. 5A

Example for 'name.html'
```
<html>
<body>
<center>HDTV Master</center>
</body>
</html>
```

FIG. 5B

Example for 'icon.html'
```
<html>
<body><center>
<a href=" ">
<image src="icon.gif">
</a>
</center></body>
</html>
```

FIG. 5C

Example for 'index.html'
```
<html>
<body>

<A HREF="javascript:setPlay()">Play</A>
<A HREF="javascript:setStop()">Stop</A>
<A HREF="javascript:setEject()">Eject</A>

………
</body>
</html>
```

FIG. 5D

Example for 'deviceinfo.xml'

```
<?xml version="1.0"?>
<deviceInfo>
<manufacture name="Samsung" serialno="ABC-123">
<functionType name="STB-NIU" subname="TUNER-DISH"
model="HWW"
</deviceInfo>
```

FIG. 5E

Example for 'serviceinfo.xml'

```
<?xml version="1.0"?>
<serviceInfo>
<operation code="CHANNEL-UP"/>
<operation code="CHANNEL-DOWN"/>
<operation code="VOLUME-UP"/>
<operation code="VOLUME-DOWN"/>
</serviceInfo>
```

Examples of command

| Confirmation of command support | Confirmation of play command :http://123.204.136.45:80/query?play |
|---|---|
| Control command | Play command : http://123.204.136.45:80/control?play?normal |
| Event | Subscribe : http://123.204.136.45:80/event?subscribe<br>Withdraw : http://123.204.136.45:80/event?unsubscribe<br>Notify : http://123.204.136.45:80/event?playmode&normal |

FIG. 9C

| Control command | Description |
|---|---|
| 0~9 | numeral command |
| UP & DOWN | up/down command |
| LEFT & RIGHT | left/right command |
| POWER | power command |
| MUTE | mute command |
| CHANNEL_UP & DOWN | channel change command |
| VOLUME_UP & DOWN | volume change command |
| ENTER | select command |
| MENU | menu command |
| ......... | ......... |

FIG. 9D

| Event | Description |
|---|---|
| PLAYMODE | play speed |
| RECMODE | record speed |
| CHANNEL | channel number |
| VOLUME | volume |
| MUTE | mute on/off |
| POWER | power on/off |
| ......... | ......... |

FIG. 10A

Confirmation of command support

| HTTP header | Description |
|---|---|
| "X-Query-Response: IMPLEMENTED" | Command supported |
| "X-Query-Response: NOT IMPLEMENTED" | Command not supported |

FIG. 10B

Control command

| HTTP header | Description |
|---|---|
| "X-Control-Response: ACCEPTED" | command accepted |
| "X-Control-Response: REJECTED" | command rejected |
| "X-Control-Response: NOT IMPLEMENTED" | command not implemented |

Event registration and notice

| HTTP header | Description |
|---|---|
| "X-Control-Response: ACCEPTED" | REGISTRATION, WITHDRAWL AND NOTICE OF EVENT ACCEPTED |
| "X-Control-Response: REJECTED" | REGISTRATION, WITHDRAWL AND NOTICE OF EVENT NOT ACCEPTED |
| "X-Control-Response: NOT IMPLEMENTED" | NOT IMPLEMENTED |

AUDIO/VIDEO DEVICE, APPARATUS AND METHOD FOR CONTROLLING AUDIO/VIDEO DEVICE

This is a Continuation of U.S. application Ser. No. 10/912,285 filed Aug. 6, 2004 which claims priority of Korean Patent Application Nos. 10-2003-0054790 and 10-2003-0068360 filed on Aug. 7 and Oct. 1, 2003, respectively, with the Korean Intellectual Property Office, and U.S. Provisional Patent Application No. 60/492,979 filed on Aug. 7, 2003, with the United States Patent and Trademark Office, the disclosures of which are incorporated herein in their entireties by reference.

BACKGROUND OF THE INVENTION

1. Field of Invention

Apparatuses and methods consistent with the present invention relate to the control of audio/video (hereinafter abbreviated as "AV") devices by use of a web browser, and more particularly, to controlling other AV devices by installing a web browser and an AV device control program on devices such as digital television (hereinafter referred to as "DTV") having a user interface (hereinafter referred to as "UI") available for interacting with users.

2. Description of the Prior Art

Generally AV devices constituting home network have been controlled by installing a web browser on such devices as DTV and PDA (Personal Digital Assistant) having user interface and then accessing respective web servers within the AV devices. Alternatively, AV devices have been controlled by installing a separate client/server program to control the AV devices thereon.

FIG. 1A illustrates a method for controlling an AV device by use of a web browser. An apparatus for carrying out this method comprises a web server of a controlled AV device 110 (hereinafter referred to as "target device") functioning as a server and a web browser of a client device 100 functioning as a client, wherein the web server receive a request message to control a target device 110 from the client device 100 such as DTV and PDA having a user interface through an HTTP (Hypertext Transfer Protocol) and transmitting a response message to the request message after processing it to the client device 100 by use of the HTTP again, and the web browser transmits the request message to the web server by use of the HTTP and receives again the response message to the request message.

Initially, a user executes a web browser of the client device 100 and accesses a URL (Uniform Resource Locator) of an AV device which he/she desires to control, through the web browser. At this time, the web browser directly accesses the web server of the target device 110. The web server of the target device 110 transmits the homepage established at the target device 110 to the client device 100. The user uses control services provided at the homepage of the target device 110 via the web browser. For example, where a D-VHS (Data-Video Home System) is a target device 100, the D-VHS as the target device 110 executes a command to PLAY as selected by the user. The web server calls back a function unique to the target device 110 from a CGI (Common Gateway Interface) to execute the user's command and transmits a result of the execution to the client device 100. At this time, the execution result is transmitted in a form of HTML (Hypertext Markup Language) code. The web browser of the client device having received the execution result then provides the result to the user.

As described above, execution of a control command provided by an AV device to be controlled, by means of a web browser through the homepage established at the AV device is advantageous in that the AV device can be controlled without knowing details of the target device. However, where an event has occurred in the AV device by a different client or by a change in internal state of the AV device, the web browser cannot know occurrence of the event. That is, since a change in state due to occurrence of an event has not been reflected in the homepage of the AV device already loaded onto the web browser, the AV device could not be operated in a normal manner. For example, a target device is in the STOP state when calling the homepage of the target device: however, where the target device has been changed to the PLAY state by other client, the target device would actually remain at the STOP state in the homepage already loaded onto the web browser before change even though the user clicks the PLAY button. Also, there is no method of holding latest data by loading again onto the homepage of the AV device loaded onto the web browser since the target device cannot know occurrence of the event.

FIG. 1B illustrates a method of controlling an AV device by use of an independent client/server program as an alternative method of controlling the AV device. An apparatus to perform this method comprises an AV apparatus 130 and a client 120, wherein the AV apparatus 130 includes a server-side program (hereinafter referred to as "server agent") receiving a request message from the client 120 through an independent protocol, processing a response to the request message, and therafter transmitting a response message to the client 120 again by use of the protocol, and the client 120 includes a client-side program (hereinafter referred to as "client agent") transmitting the request message to the AV device and receiving the response message to the request message, through the protocol, and communicating with a user interface module to be described later. When a predetermined event has occurred in the server 130, the server agent transmits details of the event to the client 120. The user interface module exists within the client 120, receiving an input by a user and transferring a result of performing the input to the user, through an interaction with the user.

As described above, where an independent program module is used between the client and the server, the user executes a menu provided by the user interface module. Then, the user selects a target device that he/she desires to control from the menu and subsequently select a command to control the target device, for example, a PLAY command to play AV data where the server 130 is an AV data playing device. At this time, the user interface module transmits a request from the user to the client agent module. The client agent module transmits the user's request to the server agent module of the server 130 by use of an independent module. The server agent module receives the request from the client, executes the command by calling a function to process the request and then transmits the result to the client agent module by use of the protocol. Then, the client agent module receives the result and transmits the same to the user interface module. Thereafter, the user interface module provides the received result to the user. If an event occurs in the server 130 by other client or due to a change in the internal state of the server 130, the server agent module transmits details of the event occurred to the client agent module. The client agent module receives the details of the event and transmits them to the user interface module. Then, the user interface module displays a message appropriate for the received event to the user.

Where an independent program module is used between the client and the server, this is advantageous in that the user can readily know the occurrence or the non-occurrence of an event in a target device to be controlled if the server agent module and the client agent module are properly designed. However, the client 120 has to know what the target device is. If new AV devices not registered with the client agent are available after each server agent is installed, the client agent cannot normally perform a control command. In a word, the client can control the AV devices currently available but cannot control new types of AV devices to be available in the future.

SUMMARY OF THE INVENTION

The present invention is conceived to solve the problems in the related art. An aspect of the present invention is to provide a method for controlling AV devices in an easy and convenient manner without knowing the particulars of the AV devices, and easily detecting generation of an event in a control device when the event has been generated in an AV device to be controlled.

To achieve the above and/or other aspects of the present invention, there is provided an apparatus for controlling an AV device, comprising a web browser receiving a structured document to contain a script from the AV device, and providing the same to a user, and a first program module including a function called by the script and transmitting information on a device control command to the AV device through a protocol previously defined by use of the function, wherein the AV device comprises a web server module transmitting the structured document and a second program module receiving the device control command information from the first program module through the protocol and controlling the AV device in response to the command information.

The second program module transmits information on an event to the first program module responsively when the event has been generated in the AV device, and the first program module transmits the received event information to the user through the web browser. In an exemplary embodiment, the device control command information includes information on channel control, information on volume control and information on PLAY control.

To achieve the above and/or other aspects of the present invention, there is provided an AV device comprising a web server module transmitting a structured document to contain a script, to an apparatus for controlling an AV device, and a first program module receiving information on a device control command information from the apparatus through a protocol previously defined and controlling the AV device in response to the device control command information, wherein the apparatus comprises a web browser providing the structured document to the user and a second program module including a function called by the script and transmitting the device control command information by use of the function through the protocol.

The first program module transmits information on an event to the second program module responsively when the event has been generated in the AV device, and the second program module transmits the received event information to the user through the web browser. In an exemplary embodiment, the device control command information includes information on channel control, information on volume control and information on PLAY control.

To achieve the above and/or other aspects of the present invention, there is provided a method for controlling an AV device comprising the steps of collecting information on respective AV devices from the AV devices connected to the network and providing the same to a user ($1^{st}$ step), receiving a menu of a control item to control an AV device if the AV device have been selected by the user among plural pieces of information on the AV devices, and providing the same to the user ($2^{nd}$ step), transmitting information on a device control command corresponding to the control item to the selected AV device by a protocol previously defined, if the control item is specifically selected by the user from the menu provided in the second step ($3^{rd}$ step), and receiving information on an event from the AV device by use of the protocol, if the event has been generated in the AV device, and processing the received event in response to the received event information ($4^{th}$ step).

In an exemplary embodiment, the collecting step comprises the sub-steps of allowing a script corresponding to a control item to call a function to transmit information on a device control command, if a user specifically selects the control item from the menu provided in the second step ($3\text{-}1^{st}$ step), and allowing the called function to transmit the device control command information to the selected AV device by use of the protocol previously defined.

In exemplary embodiment, the AV device information includes plural pieces of information on device name, image to indicate the device, device model, control function provided by the device, the script to carry out the function, and the device control command information includes information on channel control, information on volume control, and information on PLAY control.

BRIEF DESCRIPTION OF THE DRAWINGS

The above and other objects and features of the present invention will become apparent from the following description of a preferred embodiment given in conjunction with the accompanying drawings, in which:

FIGS. 5A through 5E illustrate kinds of files containing information on an AV device according to an embodiment of the present invention;

FIGS. 9A through 9D illustrate protocols for communication between a plug-in module and a server agent according to an embodiment of the present invention;

FIGS. 10A through 10C illustrate response formats to confirmation of command support and control command for communication between the plug-in module and the server agent according to an embodiment of the present invention; and FIG. 11 illustrates a construction of an initial page and a user interface of a plug-in module for an AV device according to an embodiment of the present invention.

DETAILED DESCRIPTION OF THE INVENTION

Hereinafter, a method of controlling AV devices according to an embodiment of the present invention will be described in detail with reference to the accompanying drawings.

Figure 1A:
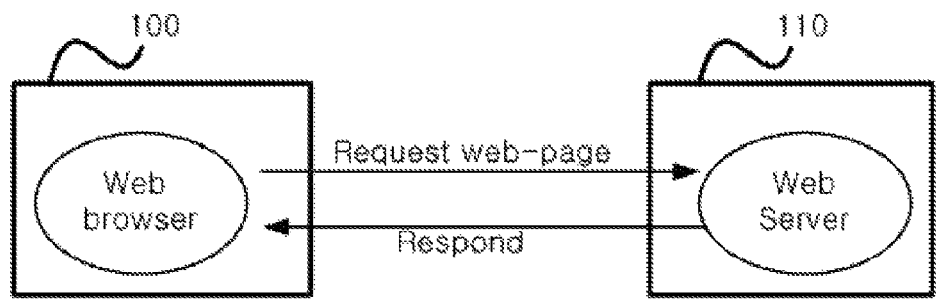
FIG. 1A illustrates a method for controlling an AV device by use of a web browser.
Figure 1B:
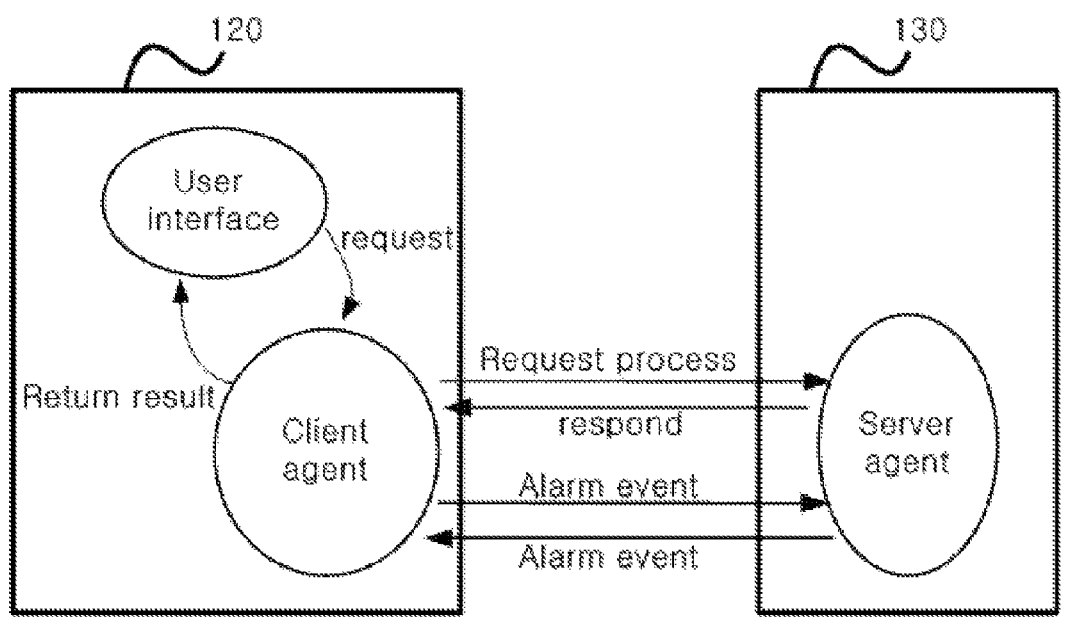
FIG. 1B illustrates a method of controlling an AV device by use of an independent client/server program.
Figure 2:
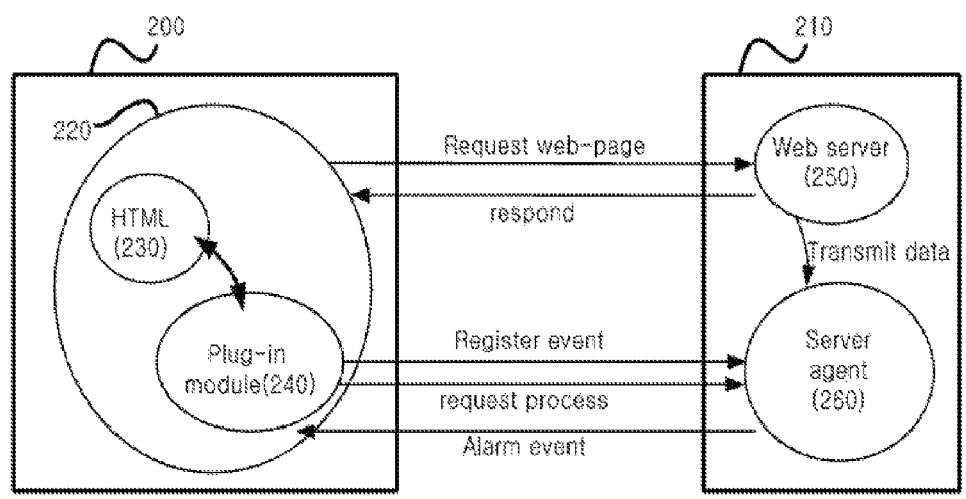
FIG. 2 illustrates a construction of an AV device control system according to an embodiment of the present invention.

FIG. 2 illustrates a construction of an AV device control system according to an embodiment of the present invention. Referring to this figure, the AV device control system comprises a client 200 corresponding to a device to control other AV device and a server 210 corresponding to a device to be controlled by the client 200.

At this time, the client 200 includes a web browser 220 to control the server 210, wherein the web browser 220 comprises a HTML file 230 described with a script such as Java script and a plug-in module 240 loaded by the web browser 220. Meanwhile, the server 210 comprises a web server 250 providing web pages of the server 210 to the web browser 220, and a server agent 260 functioning to actually control the AV device. At this time, the plug-in module 240 is a program module to process various types of materials as being connected to the web browser 220 and represent the result. Since the plug-in module 240 is automatically recognized by the web browser 220 and the function of the plug-in module 240 is incorporated into the HTML file, thereby producing the same effect as being directly executed in the web browser 220.

Figure 3:
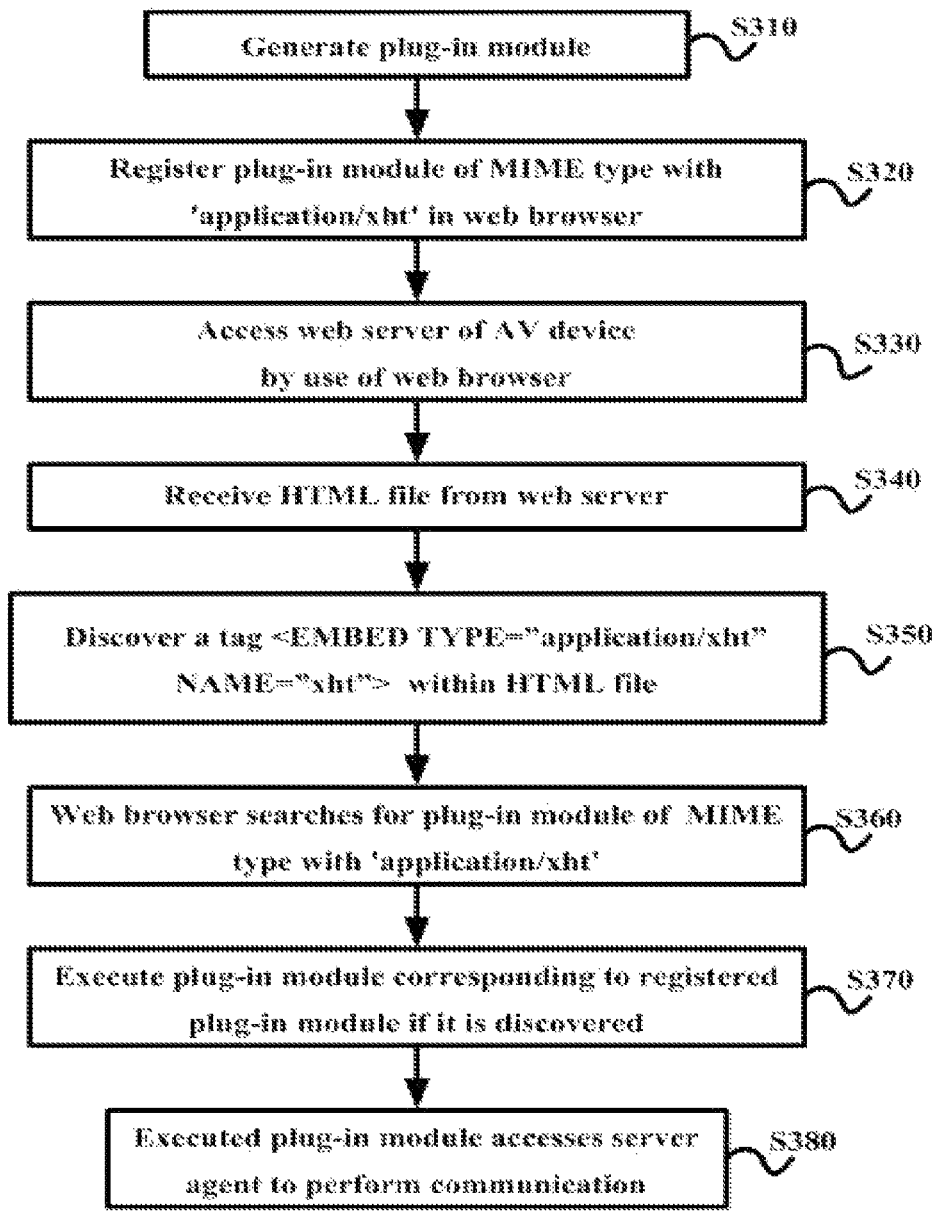
FIG. 3 is a flow chart illustrating a process wherein a plug-in module is operated in a client according to an embodiment of the present invention.

FIG. 3 is a flow chart illustrating a process wherein a plug-in module is operated in a client according to an embodiment of the present invention.

To operate the plug-in module 240, the plug-in module 240 is first generated (S310), and the plug-in module 240 defined in a specific MIME (Multipurpose Internet Mail Extensions) type is registered with the web browser 220 (S320). The plug-in module 240 then makes an access to the web server 250 of the AV device at the web browser 220 of the client 200 (S330) and receives an HTML file 230 from the web server 250 (S340). At this time, a party creating the HTML file 230 adds a tag and a script relevant to the plug-in module 240 into the HTML file 230, and the web browser 220 loading the HTML file 230 executes the relevant plug-in module 240 according to the script within the HTML file 230 (S350, S360 and S370). The plug-in module 240 executed by the web browser 220 performs a job as defined previously, in association with the server agent 260 (S380). That is, the plug-in module 240 accesses the server agent 260 of the server 210, transmits a control command, receives an event message from the server agent 260, and performs a job being associated with the script within the HTML file 230 loaded by the web browser 220. Meanwhile, when the web browser 220 loads a different HTML file in response to an input by the user or other condition, the plug-in module 240 in a process of performing the job is terminated. If any tag and script relevant to the plug-in module 240 exist within the HTML file reloaded, the relevant plug-in module 240 performs a job of transmitting the same control command as described above or receiving an event from the server agent 260.

Alternatively, to access a resource in a general manner without controlling an AV device, the web browser 220 requests the web server 250 a web page and the web server 250 provides the web page to the web browser 220 in response to the request.

However, when the AV device is controlled, the script within the HTML file 230 executes the plug-in module 240. Then, the plug-in module 240 transmits a control message to the server agent 260 within the server 210 by use of an independent protocol, and the server agent 260 calls an internal function to thereby control the AV device. Where the client 200 registers an event with the server agent 260 within the server 210 by use of the plug-in module 240, the server agent 260 transmits information on an event generated to the plug-in module 240 if the event is generated on the side of the server 210.

Figure 4:
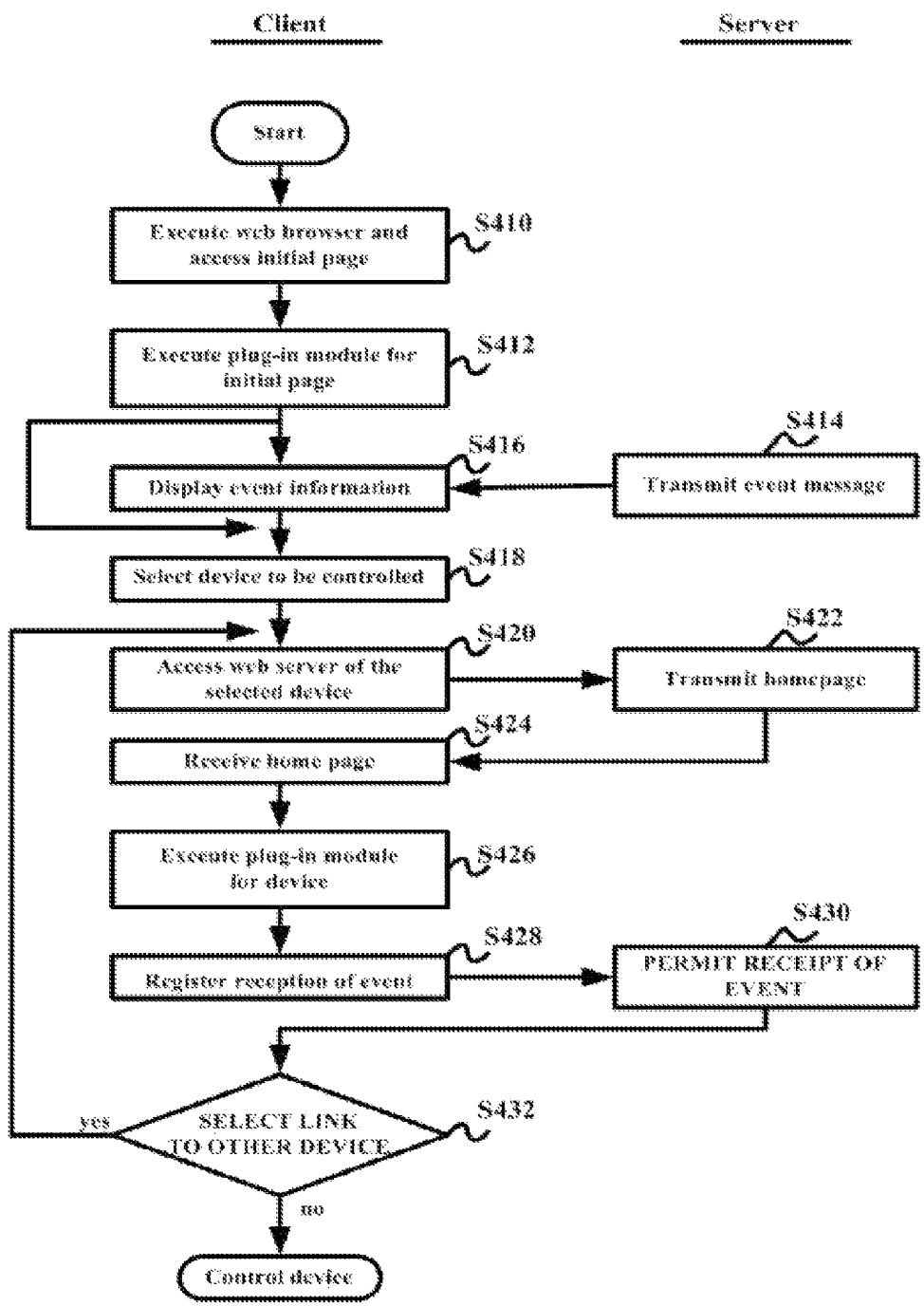
FIG. 4 is a flow chart illustrating a process of connecting a client and a server to control an AV device according to an embodiment of the present invention.

FIG. 4 is a flow chart illustrating a process of connecting a client and a server to control an AV device according to an embodiment of the present invention.

Referring to this figure, a user executes a web browser in a client and accesses an initial page (S410). The initial page includes a list of AV devices connected to the network, which may be generated through steps of discovery and description of the AV devices connected to the network or dynamically generated by the script thereof. For example, the AV devices connected to the network can be searched for by checking all of broadcast ARP (Address Resolution Protocol) packets and collecting lists of IP (Internet Protocol) addresses thereof. Meanwhile, the initial page exists within the designated URL of the client. After the search for the connected AV devices is terminated, the files indicated on Table 1 below are brought from initial URLs of the respective AV devices. At this time, "server" refers to the IP address of a server and "port" refers to the port number of the server. FIG. 5A through 5E illustrates examples of the files indicated on Table 1.

TABLE 1

List of files indicating information on AV devices

| File Name | Description |
| --- | --- |
| http://server:port/name.html | HTML file indicating names of AV devices |
| http://server:port/icon.html | HTML file indicating icons of AV devices |
| http://server:port/index.html | main HTML file controlling AV devices |
| http://server:port/deviceinfo.xml | XML file indicating general information on AV devices. E.g., it may contain information on makers such as names of makers, URIs, serial numbers, production dates and device information such as names of devices and models, etc. |
| http://server:port/serviceinfo.xml | XML file indicating information on capable operations of AV devices. E.g., it may contain 'channel-up,' 'channel-down,' 'play,' 'stop,' etc. |

After the user has accessed the initial page, a plug-in module for initial page is executed (S412). The executed plug-in module accesses the server agent of the AV devices connected to the network, the server agent transmits an event message to the plug-in module when the event is generated in the server (S414). The plug-in module receives the event message and displays information on the event in the initial page (S416). Where no event is generated, the steps S414 and S416 would not be performed.

The user selects a device to be controlled, from the device lists displayed on the web browser (S418). The web browser accesses the web server of the selected device and the web server transmits its own initial HTML file to the web browser (S420 and S422). The web browser executes the plug-in module for AV device, installed on the web browser, based on information within the received HTML file. At this time, the web browser executes the plug-in module according to contents contained in the HTML file, only when the content relevant to the plug-in module is contained therein (S424 and S426).

The plug-in module executed accesses the server agent of the server according to information within the HTML file. Registration of an event can be completed only with the access operation. However, the event can be registered though a separate operation. If the event registration is completed, the executed plug-in module can receive an event generated in the server through the server agent (S428 and S430).

If the user selects a link to another device within the web browser, the web browser moves to the step S420 and accesses the web server of the selected device. At this time, if a plug-in module has been executed in the web browser, execution of the plug-in module is terminated. Removal of a registered event can be completed only with the termination operation. However, the registered event can be removed though a separate operation.

If the user selects no link to another device, control relative to the connected device is initiated.

Figure 6:
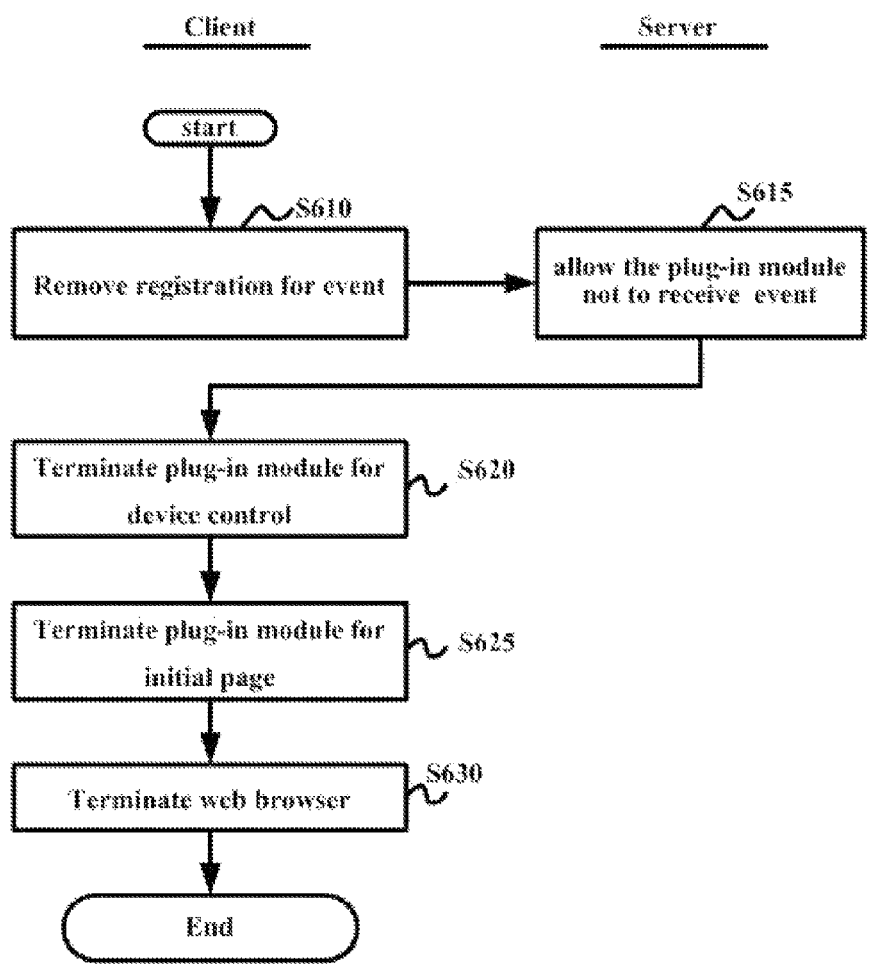
FIG. 6 is a flow chart illustrating a process of disconnecting the client and the server according to an embodiment of the present invention.

FIG. 6 is a flow chart illustrating a process of disconnecting the client and the server according to an embodiment of the present invention.

First, the plug-in module within the client requests the server agent within the server a removal of a registered event (S610), the server agent allows the plug-in module not to receive the event (S615). Then, the plug-in module for device control and then the plug-in module for initial page, both in process of execution, are terminated consequently, and the web browser is terminated (S620, S25 and S630).

Figure 7:
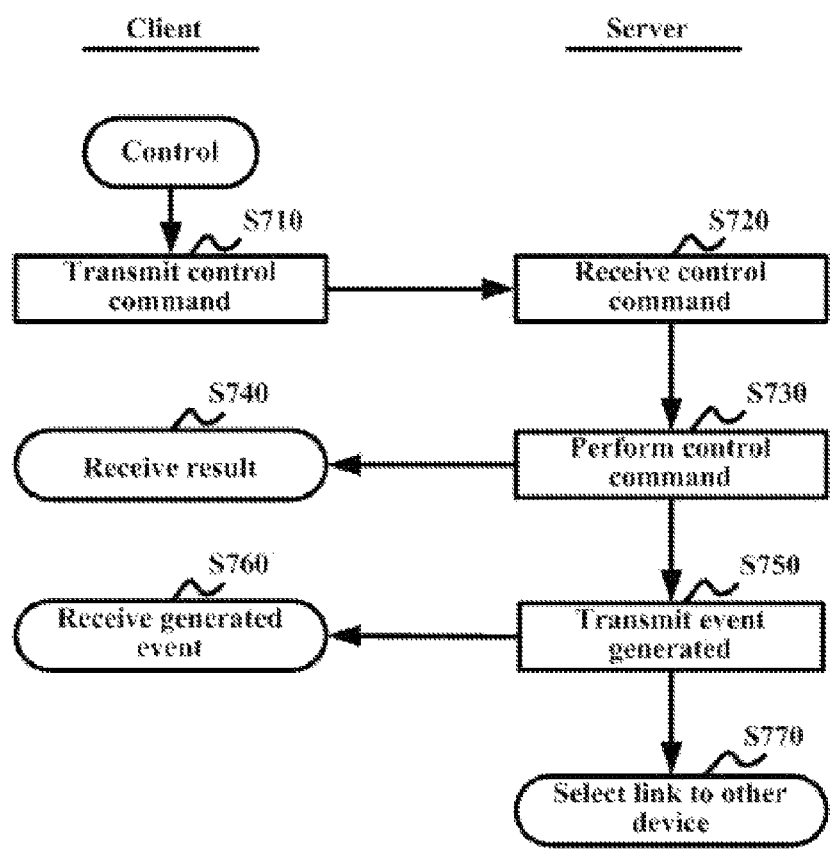
FIG. 7 is a flow chart illustrating a process of controlling an AV device according to an embodiment of the present invention.

FIG. 7 is a flow chart illustrating a process of controlling an AV device according to an embodiment of the present invention.

If a user selects a control command in the web browser, the web browser executes the script involved in the control command and the script communicates with a plug-in module so as to transmit the control command selected by the user to the plug-in module.

The plug-in module transmits the selected control command to the server agent of the server to which it has made an access (S710). At this time, the CEA-931B format can be used as the format of a control command. The server agent of the server receives the control command (S720), performs a job corresponding thereto and thereafter transmits the result of performing the job again to the plug-in module of the client (S730). The result of performing the job may be created by use of the same format as defined in CEA-931B. The plug-in module of the client receives the result of the concerned control command and transmits the same to the script within the HTML file (S740). At this time, the script within the HTML file receives the result of the command and performs an operation defined according to the result. For example, it can perform a "reloading" job to load a new web page again. Meanwhile, if an event is generated due to a change in the state of the server (e.g., if the server is changed to a STOP state from a PLAY state), the server transmits a message of the event to the plug-in module of all the clients having accessed to its own server agent (S750 and S770). The plug-in module of the client having received the transmitted event message transfers the concerned event message to the script of the HTML page currently loaded onto the web browser (S760). The script with the HTML page receives the event message and performs an operation (for example, a "reloading" operation) defined according to the event message, in the same manner as having received the result of a command. At this time, if the user selects a link to other device, the plug-in module for AV device in process of execution is terminated.

Figure 8:
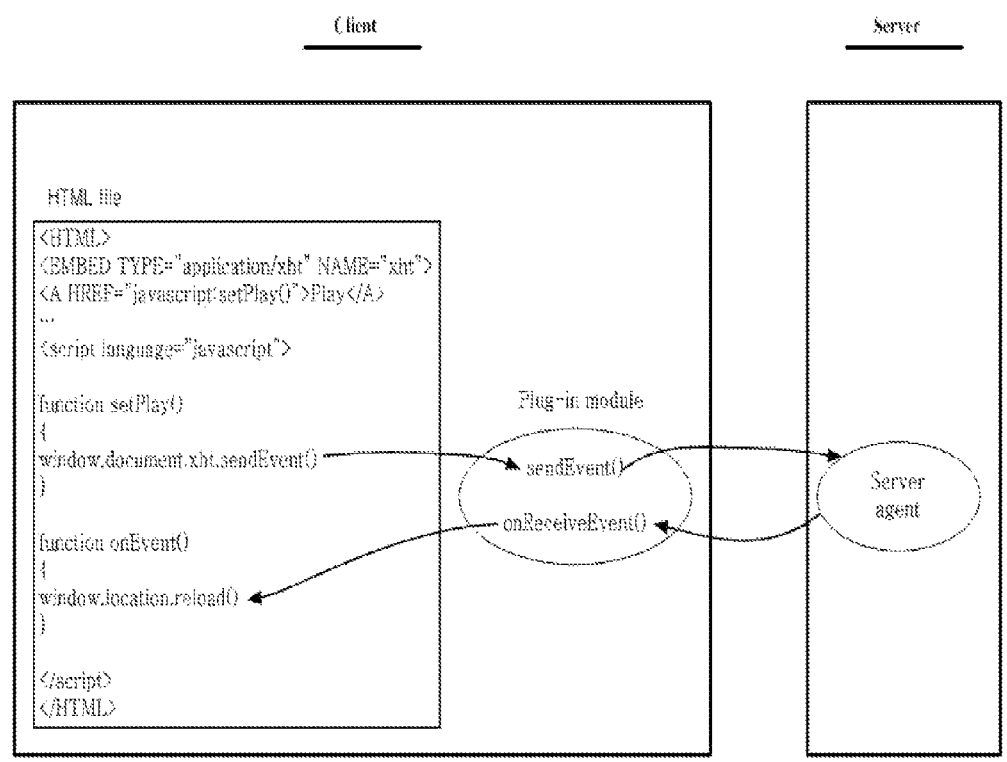
FIG. 8 illustrates source codes regarding control of an AV device and process of an event according to an embodiment of the present invention.

FIG. 8 illustrates source codes regarding control of an AV device and handling of an event according to an embodiment of the present invention.

At a client are installed a web browser and a plug-in module, and a web server and a server agent are installed at a server. The client accesses a server to be controlled, through a device list known during the step of detecting devices. The server transmits an "index.html" page to the client for controlling the server. The web browser loads a plug-in module proper for the type defined, based on an EMBED tag within the HTML page. If a user selects "PLAY," the web browser executes a function of Java script, "setPlay( )." The Java script function, "setPlay( )" calls a function of plug-in module, "sendEvent( )." The plug-in module first confirms whether "PLAY" is supported by the server, by use of a QUERY command within "sendEvent( )." If it is confirmed that "PLAY" is supported, the plug-in module transmits a "PLAY" command to the server by use of a control command. The server having received the "PLAY" command performs the "PLAY" command by use of an internal API (Application Program Interface) function, and transmits the result of performing the "PLAY" command to the plug-module of the client. The server whose internal state has been changed due to the "PLAY" command transmits an event message to the plug-in module of all the other clients in which the event has been registered. The plug-in module having received the event message of the server calls a function Java script, "onEvent( )," of the HTML page currently loaded onto the web browser. The Java script function, "onEvent( )," performs an operation corresponding to the event message of the server transmitted by the plug-in module. For example, if the message is defined as "Reload," the plug-in module informs the web browser to receive a new HTML file of the web browser from the server. Consequently, the web browser will have received the new HTML file from the server.

Figures 9A, 9B:
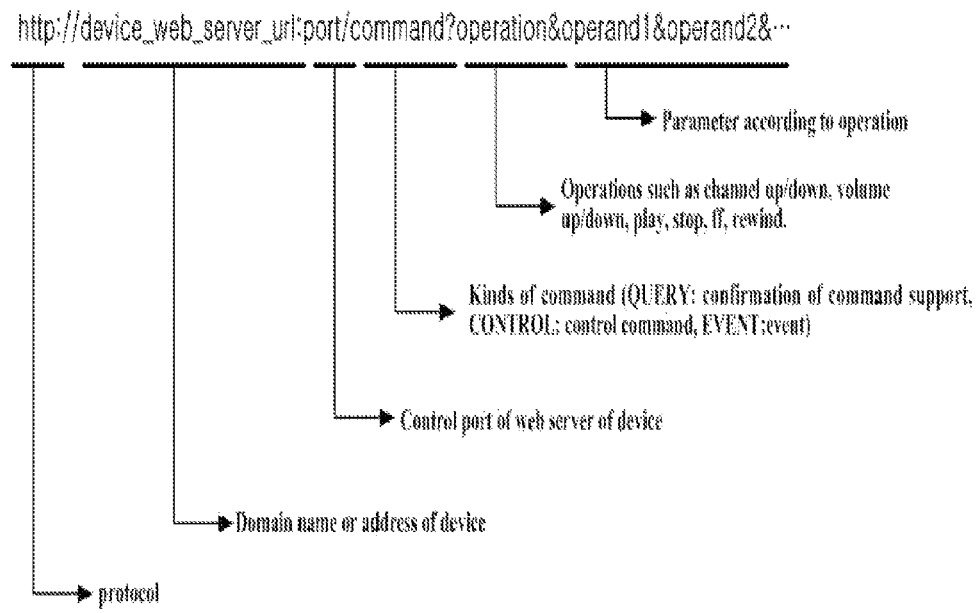

FIGS. 9A through 9D illustrate protocols for communication between a plug-in module and a server agent according to an embodiment of the present invention. Specifically, FIG. 9A illustrates a REQUEST format involved in confirming support of a command or a control command, FIG. 9B illustrates examples of command formats, FIGS. 9C and 9D illustrate lists of control commands and events according to an embodiment of the present invention.

Figures 10C, 11:
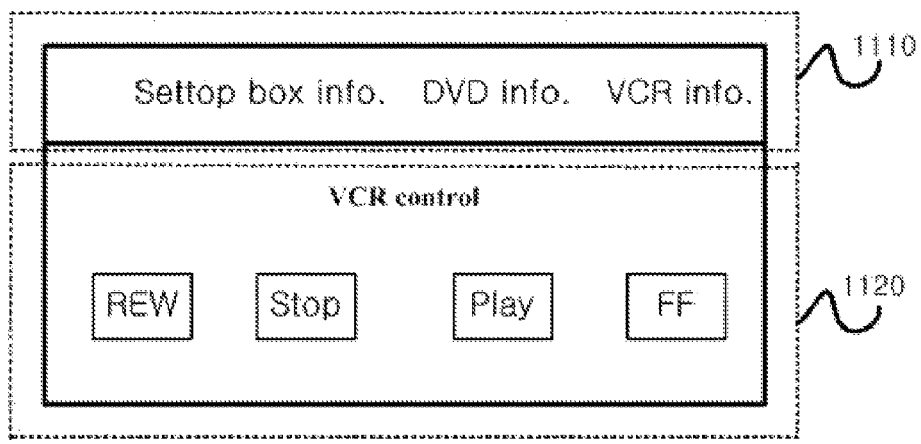

FIGS. 10A through 10C illustrate RESPONSE formats to confirmation of command support and control command for communication between the plug-in module and the server agent according to an embodiment of the present invention. RESPONSE is created by use of general responses of HTTP, and the values indicated in FIGS. 10A through 10C are included in the HTTP header.

FIG. 11 illustrates a construction of an initial page and a user interface of a plug-in module for an AV device according to an embodiment of the present invention.

The initial page 1110 displays AV devices connected to the client and receives an event message of the connected AV devices. The initial page 1110 is continuously loaded while the web browser is being executed, thereby functioning as a monitoring page to monitor the whole state of the connected AV devices. The user interface 1120 of the plug-in module for AV device indicates a control interface relative to a specific device selected by the user, and receives an event message of an AV device currently connected.

As described above, the present invention is advantageous in that a device such as DTV, which desires to control a different AV device, can easily control the concerned device in a convenient manner, without knowing particulars of the device, and also other AV devices currently not available but later available in the market can easily be participated in the network since a simple command structure to control the AV devices is used. Further, even though the AV device currently controlled by the user changed its state because of other AV devices, the user can recognize the changed state of the AV device and positively cope with such a change in state since the plug-in module is associated with the script according to an embodiment of the present invention.

Although the present invention has been described in connection with the embodiments illustrated in the drawings, it will be apparent to those skilled in the art that various substitutions, modifications and changes may be made thereto without departing from the technical spirit and scope of the invention. Thus, the present invention is not limited to the embodiments and the accompanying drawings.

What is claimed is:

1. An apparatus for controlling an audio/video (AV) device, comprising:
    a processor;
    a browser which receives a structured document including a script from the AV device, the script including a first function and a second function; and
    a program module, executed by the browser, to transmit a request to the AV device to query whether the first function of the script received from the AV device is supported by the AV device, receive, from the AV device, a response that indicates whether the first function of the script is supported by the AV device, and transmit device control command for performing the first function of the script to the AV device through a protocol if the response received by the program module indicates that the first function of the script is supported by the AV device,
    wherein the program module receives information of an event from the AV device when the event is generated in the AV device, and calls the second function of the script to perform an operation corresponding to the received event information.

2. The apparatus as claimed in claim 1, wherein the device control command includes information on channel control.

3. The apparatus as claimed in claim 1, wherein the device control command includes information on volume control.

4. The apparatus as claimed in claim 1, wherein the device control command includes information on PLAY control.

5. The apparatus as claimed in claim 1, wherein the processor controls the browser.

6. The apparatus as claimed in claim 1, wherein the program module transmits, to the AV device, a request for registering the event in the AV device.

7. An audio/video (AV) device, comprising:
    a processor;
    a server module which transmits a structured document including a script to an apparatus controlling the AV device, the script including a first function and a second function; and
    a program module which receives device control command for performing the first function of the script from the apparatus through a protocol and which controls the AV device in response to the device control command,
    wherein the program module receives, from the apparatus, a command to query whether the first function of the script is supported by the AV device, and sends a response to the apparatus, and, if the response indicates that the first function of the script is supported by the AV device, the program module receives the device control command from the apparatus through the protocol,
    wherein the program module transmits information of an event to the apparatus when the event is generated in the AV device, and the second function of the script transmitted from the AV device is used to perform an operation corresponding to the event information.

8. The AV device as claimed in claim 7, wherein the device control command includes information on channel control.

9. The AV device as claimed in claim 7, wherein the device control command includes information on volume control.

10. The AV device as claimed in claim 7, wherein the device control command includes information on PLAY control.

11. The AV device as claimed in claim 7, wherein the processor controls the browser.

12. The AV device as claimed in claim 7, wherein the program module receives a request for registering the event in the AV device from the apparatus.

13. A method for controlling an AV device, comprising:
    (a) collecting information on a plurality of AV devices from the plurality of AV devices connected to a network and providing the information to a user;
    (b) if the AV device is selected to be controlled by the user from the information on the plurality of AV devices, providing a menu of a control item of a device controlling the AV device and a script corresponding to the control item, the script describing a function of the device controlling the AV device, the script including a first function and a second function;
    (c) calling, by the script corresponding to the control item, the first function to transmit device control command for performing the first function of the script, if the user specifically selects the control item from the menu provided in (b), transmitting, to the AV device, a command to query whether the first function of the script Is supported by the AV device. and transmitting the device control command to the AV device in response to confirmation that the first function of the script is supported by the AV device;
    (d) if an event is generated in the selected AV device, receiving information on the event as received event information from the selected AV device by use of the protocol, calling the second function of the script and performing an operation corresponding to the received event information by using the second function of the script.

14. The method as claimed in claim 13, wherein the information on the plurality of AV devices includes information on a device name, an image to indicate a device, a device model, the function provided by the device, and the script to carry out the function.

15. The method as claimed in claim 13, wherein the device control command includes information on channel control.

16. The method as claimed in claim 13, wherein the device control command includes information on volume control.

17. The method as claimed in claim 13, wherein the device control command includes information on PLAY control.

18. The method as claimed in claim 13, further comprising transmitting, to the AV device, a request for registering the event in the AV device.

* * * * *